United States Patent [19]

Smaller

[11] 3,760,123

[45] Sept. 18, 1973

[54] EFFICIENT DIRECT CONTACT TRANSFER OF LONG WAVELENGTH SIGNALS

[76] Inventor: Philip Smaller, 4155 Wilke St., Palo Alto, Calif. 94306

[22] Filed: Apr. 7, 1972

[21] Appl. No.: 242,014

[52] U.S. Cl.179/100.2 E, 235/61.12 M, 346/74 MP, 346/74 MT

[51] Int. Cl. .............................................. G11b 5/86

[58] Field of Search ............................. 179/100.2 E; 346/74 MP, 74 MT; 235/61.12 M

[56] References Cited

UNITED STATES PATENTS

| | | | |
|---|---|---|---|
| 2,918,537 | 12/1959 | Camras | 179/100.2 E |
| 2,738,383 | 3/1956 | Herr et al. | 179/100.2 E |
| 2,795,651 | 6/1957 | Camras | 179/100.2 E |
| 2,747,026 | 5/1956 | Camras | 179/100.2 E |
| 3,573,390 | 4/1971 | Frost | 179/100.2 E |
| 2,926,219 | 2/1960 | Hollmann | 179/100.2 E |
| 3,037,090 | 5/1962 | Bouzemburg | 179/100.2 E |
| 3,277,244 | 10/1966 | Frost | 179/100.2 E |

*Primary Examiner*—Vincent P. Canney
*Assistant Examiner*—Stuart Hecker
*Attorney*—Charles M. Hogan et al.

[57] ABSTRACT

A selected signal track on a master magnetic tape having other signal tracks is direct contact transferred to a copy tape. The portion of the copy tape in line with the selected signal track is magnetically biased by magnetic lines of force emanating from a high permeability magnetic structure. This structure is spaced from the copy tape a predetermined amount sufficient to prevent dispersal of the longest wavelength magnetic signals on the master tape but close enough to localize the magnetic bias on the copy tape for efficient signal transfer only of the selected signal track.

3 Claims, 3 Drawing Figures

EFFICIENT DIRECT CONTACT TRANSFER OF LONG WAVELENGTH SIGNALS

The present invention relates to apparatus and methods for the direct contact transfer of magnetic signals from a master to a copy storage medium.

The art of transferring magnetic signals by the direct contact method has been highly developed over the years. Briefly, this method comprises the placing of magnetic master and copy tapes in intimate contact and magnetically biasing the copy tape during this contact to cause the magnetic signals on the master tape to be transferred to corresponding signals on the copy tape. This method enables economical and effective production of copy tapes in large volume.

In contact recording the situation frequently arises where it is necessary to transfer a narrow track of magnetic information without disturbing recorded information on the regions adjacent the track. In the past the approach to this problem has been to place a high permeability magnetic structure in close proximity to the copy tape to localize the magnetic transfer field. However, when this is done it has been found that the long wavelength signal transfer efficiency is reduced.

Accordingly, it is an object of the present invention to enhance the transfer efficiency of long wavelength signals in a direct contact transfer of the signals.

This end is achieved by placing a copy storage medium in contact with a master storage medium having a selected signal track. A high permeability structure spaced from the copy tape a predetermined distance magnetically biases the copy tape. This distance is sufficient to prevent dispersal of the longest wavelength magnetic signals on the signal track by the magnetic structure but close enough to localize the magnetic bias on the copy storage medium for efficient signal transfer only of the selected signal track.

The above and other related objects and features of the present invention will be apparent from a reading of the description of the disclosure shown in the accompanying drawing and the novelty thereof pointed out in the appended claims.

Figure 1:
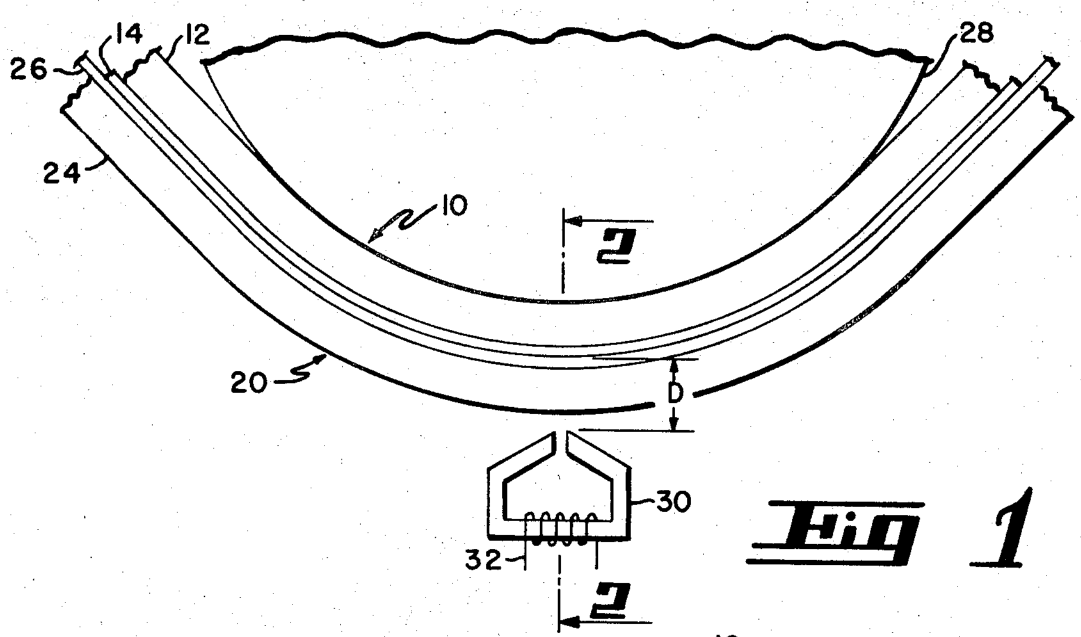
FIG. 1 is a diagrammatic view of a direct contact transfer method employing the present invention.
Figure 2:
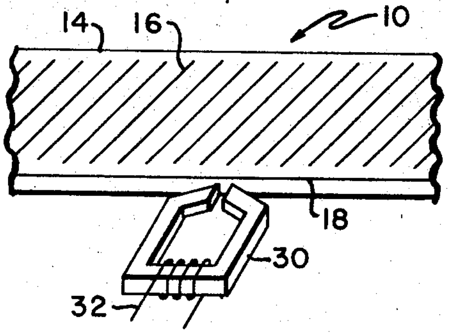
FIG. 2 is a fragmentary view of the master tape of FIG. 1 having a selected signal track to be transferred utilizing the methods of the present invention, along with a perspective showing of a magnetic biasing means shown in FIG. 1.

Referring to FIG. 1 there is shown a master tape, generally indicated by reference character 10, comprising a flexible support backing 12 and a magnetizable ferromagnetic layer 14. As shown in FIG. 2, the magnetizable layer 14 may have recorded on it a number of magnetic signal tracks. As illustrated, there are a series of slant tracks generated along lines 16 and a longitudinal track 18 generally parallel to the edge of the tape 10. When used for video tape recording the slant tracks 16 produce signals that generate the television picture and the signal track 18 generates the signal that produces the sound associated with the picture. Generally speaking, the signals found on tracks 16 have relatively short wavelengths while the signals found on track 18 have both short and long wavelengths, since they occupy a large number of octaves of frequency.

The signal track 18 is transferred by direct contact transfer techniques from the master 10 to a copy tape 20. The copy tape 20 comprises a flexible backing 22 having a magnetizable ferromagnetic layer 26 on it. The master and copy tapes 10 and 20 are placed in intimate slippage-free contact by passing them around a drum 28 through a suitable reel and tensioning arrangement.

While the tapes are in intimate contact the copy tape 20 is biased magnetically by magnetic field emanating from a high permeability magnetic core structure 30. An AC magnetic field is generated from the core 30 by AC current from a suitable source passing through a coil 32. As shown particularly in FIG. 2, the core 30 is placed in line with the signal track 18 on the master tape 10.

In accordance with the present invention the magnetic core 30 is spaced from the copy tape 26 a predetermined distance D. As described in detail below, this distance is sufficient to prevent dispersal of the longest wavelength magnetic signals on the signal track 18 by the core 30. At the same time it is close enough to localize the magnetic bias it produces on the copy tape for efficient signal transfer only of the signal track 18.

During operation of the above apparatus the tapes 10 and 20 are moved around the drum 28 while the copy tape is magnetically biased in line with signal track 18 by the lines of force emanating from the core 30. A magnetized region on the signal track 18 consisting of a long wavelength signal, for example 40 mils, or forty-thousandths of an inch, generates magnetic lines of force that extend beyond the magnetizable layer 26 on the copy tape 20. Because these lines of force extend beyond the magnetizable layer 26, they could be dispersed by the high permeability core 30 if it was in intimate contact with tape 20. This would reduce the field intensity and result in a very inefficient signal transfer. By spacing the core 30 from the magnetic layer 26 by the distance D, it is beyond the point at which it can substantially influence the field emanating from the long wavelength on the master tape 10. However, the core 30 cannot be spaced so far that its magnetic field is not localized. If the core 30 is spaced too far from the tape 20 the magnetic field necessary to properly bias the copy tape in the vicinity of track 18 is extended so far that it can effect that portion of track 16 which is adjacent to track 18 and cause inadvertent transfer of the signals on track 16 during the process. Thus the core 30 is positioned at a predetermined distance from the magnetizable surface of the copy tape within a minimum limit set by the wavelength of the lowest frequency signals and a maximum limit set by the need to localize the field to such an extent that it provides efficient signal transfer only of the selected track.

For efficient signal transfer of signal track containing signals having a longest wavelength of $\lambda_l$, the core 30 can be spaced from the magnetic layer 26 a distance D between $0.1\lambda_l$ and $0.3\lambda_l$. This range is readily apparent by considering that the magnetic field originates from a magnetized region on the master tape and decreases exponentially with distance, as follows:

$$H_m = H_{oe} \frac{-2\pi S}{\lambda}$$

where:

$H_o$ = The maximum magnetic field which exists at the surface of the master tape, $H_m$ = The magnetic field at a distance $S$ from the master tape, $\lambda$ = The wavelength of the signal on the master tape.

From the above formula it is readily apparent that the intensity of the field drops off rapidly at points spaced from the master tape. In fact, at a distance of $S/\lambda = 0.1$, the magnetic field intensity has decreased to approximately one-half of its strength at the master tape surface. Because the field does drop off rapidly, the core need be placed only a small distance away, namely, between $0.1\lambda_l$ and $0.3\lambda_l$ and it will have relatively little influence on the field shape and distribution. If the longest wavelength $\lambda_l$ is 40 mils, the transfer core 30 should be spaced between 4 mils and 12 mils from the copy tape.

Figure 3:
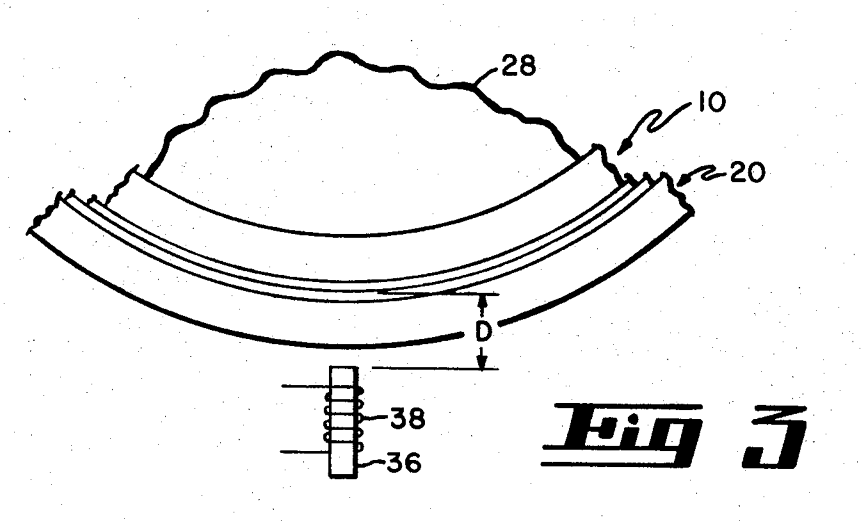
FIG. 3 is a similar embodiment of the present invention.

It should be noted that the spacing of the core 30 from the tape is not solely applicable to a C core. As seen in FIG. 3, a bar-shaped high permeability core 36 is surrounded with a coil of wire 38. This produces a magnetic bias on the copy tape to enable the signal transfer. The end of the bar 36 is spaced from the copy tape the same distance D to produce the efficient transfer of long wavelength signals on the copy tape.

While several preferred embodiments of the present invention have been illustrated, it should be apparent to those skilled in the art that other embodiments may be utilized without departing from the spirit and scope of the present invention.

Having thus described the invention what is claimed as novel and desired to be secured by Letters Patent of the United States is:

1. Apparatus for the contact transfer of a selected signal track containing audio signals of longest wavelength $\lambda_l$ from a master magnetic storage medium having other signal tracks to a copy magnetic storage medium, said apparatus comprising:

means for maintaining said master and copy storage mediums in substantially slippage-free contact;

means for magnetically biasing said copy storage medium in line with said selected signal track during the contact transfer, said magnetic biasing means including a high permeability magnetic structure spaced from the copy storage medium at least $0.1\lambda_l$ to prevent dispersal by said magnetic structure of the longest wavelength magnetic signals on said selected signal track and no more than $0.3\lambda_l$ to localize the magnetic bias on said copy storage medium for efficient transfer only of said selected signal track.

2. Apparatus as in claim 1 wherein the longest wavelength $\lambda_l$ of said audio signals is approximately 40 mils and said magnetic structure is spaced between 4 mils and 12 mils from said copy tape.

3. Apparatus as in claim 1 wherein:

said master and copy magnetic storage mediums comprise magnetic tapes;

said selected siganl track extends in a direction parallel to the longitudinal edge of said tapes; and said other signal tracks are slanted with respect to the side edge of said tapes and terminate adjacent said selected signal track, said other signal tracks containing video signals having relatively short wavelengths.

* * * * *